United States Patent
Bennett

(10) Patent No.: US 11,766,683 B1
(45) Date of Patent: Sep. 26, 2023

(54) LAWN SPRINKLER

(71) Applicant: Lewis Peter Bennett, Shaker Heighls, OH (US)

(72) Inventor: Lewis Peter Bennett, Shaker Heighls, OH (US)

(*) Notice: Subject to any disclaimer, the term of this patent is extended or adjusted under 35 U.S.C. 154(b) by 0 days.

(21) Appl. No.: 16/941,622

(22) Filed: Jul. 29, 2020

(51) Int. Cl.
| | |
|---|---|
| *B05B 3/02* | (2006.01) |
| *A01G 25/02* | (2006.01) |
| *B05B 3/06* | (2006.01) |
| *B05B 3/00* | (2006.01) |

(52) U.S. Cl.
CPC ............ *B05B 3/021* (2013.01); *A01G 25/023* (2013.01); *B05B 3/00* (2013.01); *B05B 3/06* (2013.01)

(58) Field of Classification Search
CPC .............. B05B 3/00; B05B 3/021; B05B 3/06
USPC .......... 239/227, 229; 138/106, 107, 115–117
See application file for complete search history.

(56) References Cited

U.S. PATENT DOCUMENTS

| | | | | |
|---|---|---|---|---|
| 437,118 | A * | 9/1890 | Hoyt .................. | B05B 3/08 239/231 |
| 1,796,942 | A * | 3/1931 | Pottenger, Jr. ........ | B05B 3/0454 239/242 |
| 2,601,655 | A * | 6/1952 | Young .................... | B05B 1/267 239/601 |
| 2,758,874 | A * | 8/1956 | Snyder ..................... | B05B 3/00 239/229 |
| 3,759,445 | A * | 9/1973 | King ...................... | A01G 25/00 239/201 |
| 4,261,514 | A * | 4/1981 | Kennard ................. | B05B 3/00 239/242 |
| 4,684,066 | A * | 8/1987 | Uzrad ..................... | B05B 3/00 239/121 |

* cited by examiner

*Primary Examiner* — Qingzhang Zhou
(74) *Attorney, Agent, or Firm* — GUGLIOTTA & GUGLIOTTA LPA

(57) ABSTRACT

A lawn sprinkler is provided that restrains a hydrodynamic water discharge from a flailing fluid nozzle in a manner adapted for distributing watering a user-defined area. The instant abstract is neither intended to define the invention disclosed in this specification nor intended to limit the scope of the invention in any way.

19 Claims, 2 Drawing Sheets

LAWN SPRINKLER

RELATED APPLICATIONS

None.

BACKGROUND OF THE INVENTION

1. Field of the Invention

The present invention relates generally to lawn sprinklers, and, more particularly, to an improved adjustable lawn sprinkler particularly adapted for watering a user-defined area.

2. Description of the Related Art

Many homeowners take great pride in a well-manicured lawn. Although there are many factors involved with keeping a well-manicured lawn, an extremely important factor includes proper lawn irrigation. Many homeowners rely on lawn sprinklers for irrigating their lawns, and there are several different types of lawn sprinklers available to homeowners.

However, the typical lawn sprinkler is designed to irrigate a lawn in an arcuate or semi-arcuate pattern. Since most lawns take on a generally rectangular or square shape, the arcuate or semi-arcuate irrigation pattern becomes a problem and does not efficiently irrigate a homeowner's lawn. If only one lawn sprinkler is used, the lawn sprinkler must be repeatedly transferred to new areas in order to irrigate the entire area of the lawn. Further, since the irrigation pattern is arcuate or semi-arcuate by design, water is likely to be dispersed outside of the rectangular or square shape of the lawn resulting in wasted water. A user can eliminate the problem of transferring a single lawn sprinkler to various areas by utilizing a plurality of lawn sprinklers arranged in an overlapping fashion to cover the entire area of the lawn. Although this removes the need for transferring, this tends to increase the amount of wasted water due to the overlapping, as well as still dispersing water outside of the typical lawn boundary.

A different type of lawn sprinkler, an oscillating-type lawn sprinkler, is designed to irrigate lawns in a rectangular or square shape. These are beneficial when dealing with truly rectangular or square shaped lawns, but require the sprinkler itself to be placed in the middle of the lawn and then removed for mowing. Furthermore oscillating-type lawn sprinklers irrigate in a rectangular pattern, and are strictly limited to dispersing water within that rectangular or square geometry and are not beneficial for irregularly shaped lawn areas.

Other attempts have been made to produce lawn sprinklers with non-circular irrigation patterns, and these attempts usually involve modifying a standard impulse sprinkler. Standard impulse sprinklers have been modified by changing the vertical spray angle while rotating the nozzle of the lawn sprinkler, or by varying the flow rate while the sprinkler rotates, in an attempt to alter the range of the jet. Although a non-circular irrigation pattern is produced, the irrigation pattern tends to be unpredictable and cannot be varied sufficiently to water a square or rectangular area.

Of considerable relevance is U.S. Pat. No. 9,149,819, issued on Oct. 6, 2015 to the present inventor. While the '819 reference teaches an improved adjustable lawn sprinkler providing for a geometric adjustable spray pattern, the counterbalance freely rotating nozzle mechanism taught therein has proven to be difficult to manufacture and unreliable in operation. Specifically, it has been found that the complexity of the nozzle and the mechanisms to allow it to pivot and rotate may fail to operate reliably and consistently in a manner necessary for commercial deployment.

Consequently, a need has been found for improvements to the '819 patent that is capable of retaining a basic concept of providing adjustable supporting barriers to provide positionable limits on a sprinkler spray pattern while providing a reliable and simpler mechanism for movement of the spray nozzle.

SUMMARY OF THE INVENTION

It is therefore an object of the present invention to provide an improved lawn sprinkler.

It is a feature of the present invention to provide an improved adjustable lawn sprinkler particularly adapted for watering a user-defined area from a single convenient location anywhere within or even outside that area.

It is yet another feature of the present invention to facilitate the irrigation of irregularly shaped areas of a lawn, where the user selects an area to be irrigated and adjusts the lawn sprinkler irrigation pattern to coincide with the selected area.

Briefly described according to a preferred embodiment of the present invention, an improved adjustable lawn sprinkler is provided having a directionally pliable nozzle assembly formed of a rigid and flexible tube to move about in a dynamic flailing motion. The nozzle assembly may be formed of a lower rigid tubing element that is hingedly affixed at or near a nadir connection and in fluid communication with a flexible rubber supply hose at a supply hose connection. Two lengths of rigid tubing, an upper and lower, may be connected together at the center by a short hinge of flexible rubber hose to provide a rotational joint. A discharge nozzle may then terminate the apex of the nozzle assembly. A limiting ring, acting on the lower tubing, may then be provided for circumscribing the perimeter of the sprinkler.

In any embodiment the central rotational joint provides a limit to the amount the flexible tube may rotate or bend near a center point. In a preferred embodiment the rotational limitation near the center point may be limited to between about 15 degrees to about 30 degrees in any direction from vertical. The hinged center point provides a first limitation to the directionality of the flailing effect created by the hydrodynamic forces of pressurized water discharging from the nozzle by maintaining the water stream in a generally upward direction. The outer limiting ring may thereby further provide a sprinkler pattern limitation and allow the user to adjust and configure an overall spray pattern.

In accordance with a preferred embodiment, an adjustable lawn sprinkler is provided that can be easily adjusted to irrigate an irregularly shaped area within a lawn.

An advantage of the present invention is that it can be positioned anywhere within or next to a certain area to be irrigated.

Another advantage of the present invention is that it need not be permanently installed but can be easily transferred from one location to a next location if desired.

Yet another advantage of the present invention is that is can be made with a variety of materials or in a variety of color combinations to allow for innovative design.

Further, the present invention can be economically and conveniently manufactured to provide easy irrigation of irregularly shaped areas of a lawn.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
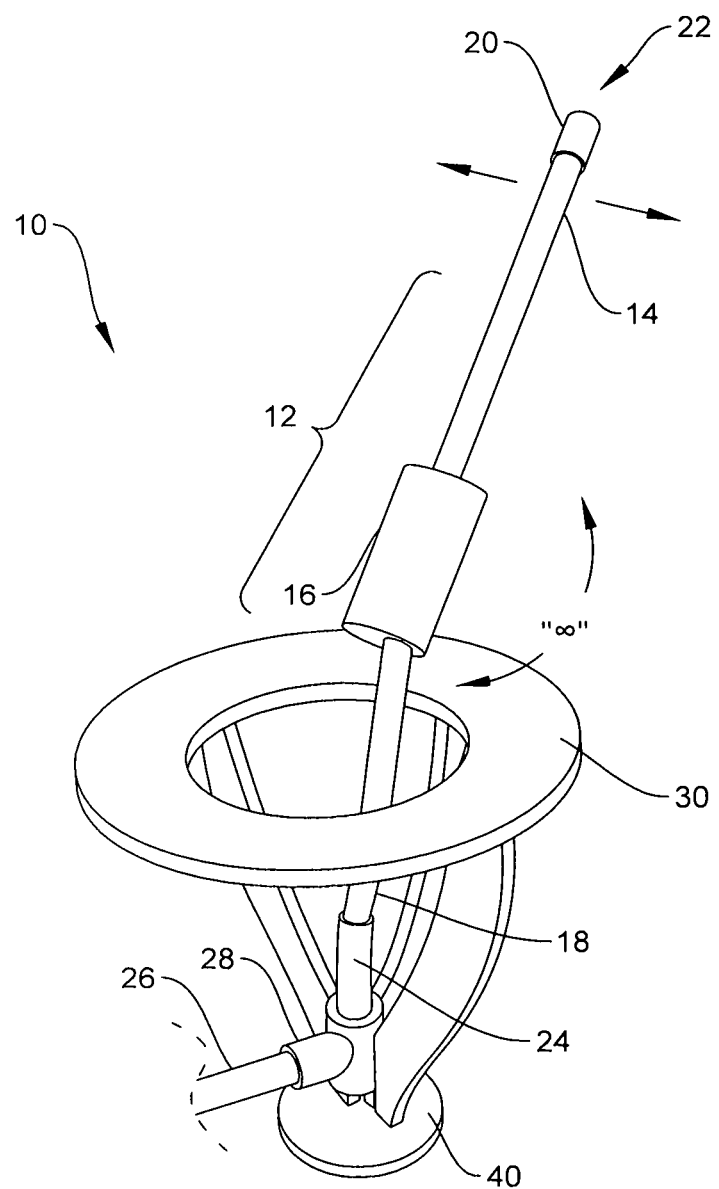
FIG. 1 is a photograph showing a perspective view of a prototype improved adjustable lawn sprinkler according to a preferred embodiment of the present invention.
Figure 2:
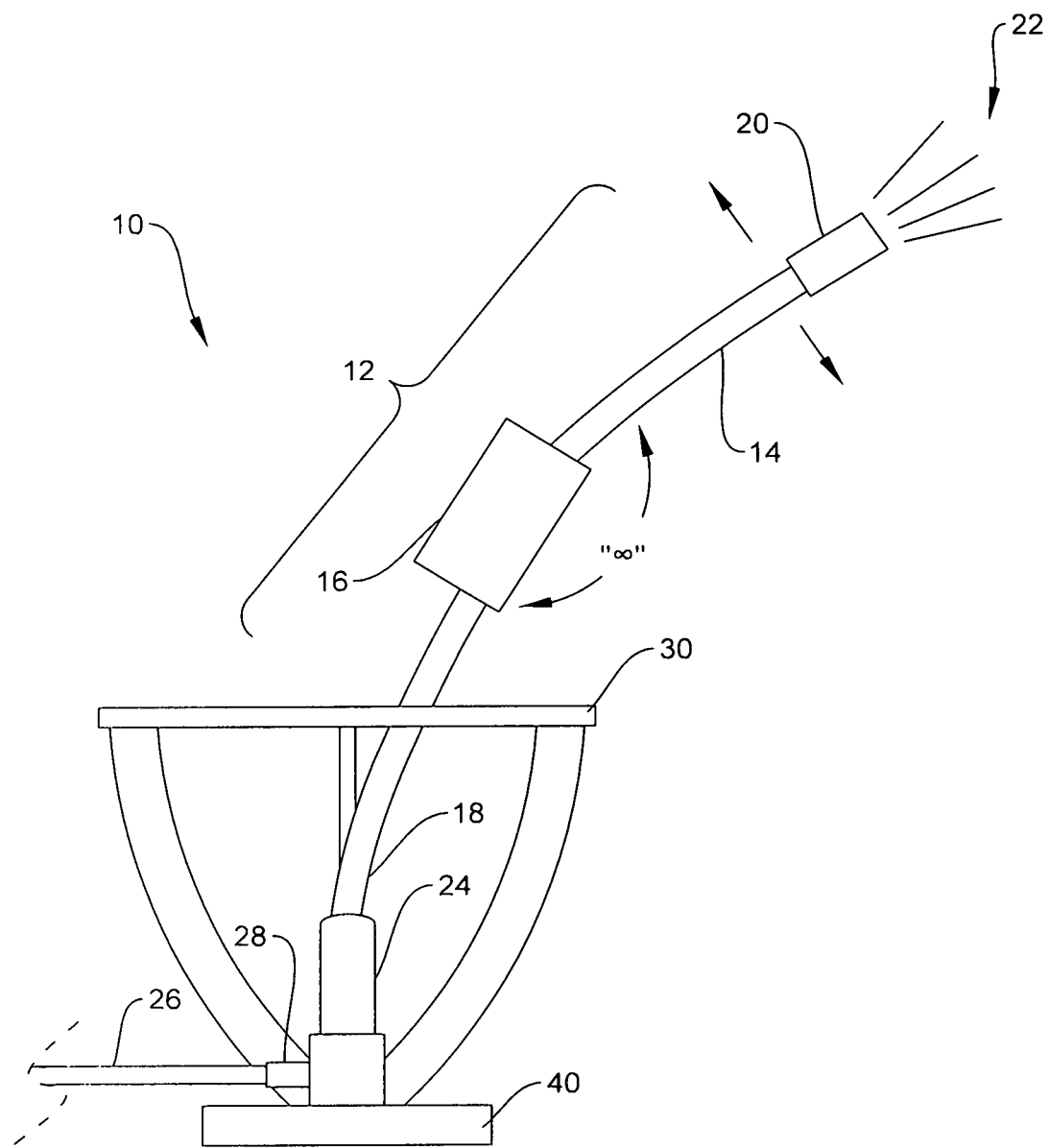
FIG. 2 is a front elevation schematic view thereof.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

The best mode for carrying out the invention may be better understood in conjunction with a description of similarities and differences in other related, and unrelated, existing art. One example is an air dancer, an inflatable device commonly characterized by a tubular body with a first open end that can be attached to a blower. At the first open end, the blower can inflate the tubular body with gas, e.g., air. The air can exit the tubular body at another open end. As air from the blower flows through the tubular body, the air dancer can move. Air dancers with multiple tubular portions can resemble humans with tube arms and/or legs that move with lifelike, unpredictable, dynamic, dancing-like motion. For practical applications, air dancers have been used for advertising and for providing entertainment value at social events, such as parties, weddings, and school events. Exemplary air dancers and related teachings are disclosed by U.S. Pat. No. 6,186,857 to Gazit et al., the entirety of which is incorporated by reference herein. However, while a similar fluid dynamics may be utilize, the present invention is distinguished in that, inter alia, the randomness of motion has been tamed and harnessed so as to be effectively utilized.

Another example is an otherwise conventional high-pressure water hose that is allowed to discharge high velocity liquid in an uncontrolled manner. In such a system the water can exit the hose discharge the fluid dynamics of the flow cause a jet momentum that exerts radial forces onto the nozzle end. When these forces exceed any anchor forces, the nozzle end begins to move, with each movement redirecting the fluid jet momentum forces and causes a change in direction. Such an uncontrolled water discharge results in the nozzle end 'flailing', a condition that is otherwise generally considered undesirable at best and dangerous at worst. Again, while a similar fluid dynamics may be utilize, the present invention is distinguished in that, inter alia, the randomness of motion has been tamed and harnessed so as to be effectively utilized.

The best mode for carrying out the invention is presented in terms of its preferred embodiment, herein depicted within the Figures, captures these otherwise undesirable effects to create a desired and functional result.

1. Detailed Description of the Figures

Referring now to the figures, an improved adjustable lawn sprinkler 10 is provided according to the preferred embodiment of the present invention. The lawn sprinkler 10 has a flexibly rotating nozzle assembly 12 having a top portion 14, a middle portion 16 and a bottom portion 18. The top portion 14 of the nozzle assembly 12 has a nozzle 20 at its uppermost terminus for producing a spray of water 22. According to the angle of the nozzle assembly 12, the nozzle 20 preferably dispenses the stream of water at an angle directed and adjusted by the user.

The nozzle assembly 12 may be formed of a flexibly articulating tube formed of a rigid and flexible tube combination to move about in a dynamic flailing motion. The flexible tube may be formed of a lower tubing element 18 hat is hingedly affixed 24 at or near a nadir connection and in fluid communication with a supply hose 26 at a supply hose connection 28. A loosely fitted rigid sleeve or collar may form the middle portion 16 and be positioned generally between the lower tubing element 18 and an upper tubing element 14. This middle portion 16 provides an axial limiting of the dynamic flailing motion. The two lengths of rigid tubing, an upper and lower, may be connected together at the center by a short hinge of flexible rubber hose to provide a similar rotational joint. A discharge nozzle may then terminate the apex of the nozzle assembly. A limiting ring may then be provided for circumscribing the perimeter of the sprinkler.

In any embodiment the central rotational joint 16 provides a limit to the amount the flexible tube may rotate or bend 'α' near a center point. In a preferred embodiment the rotational limitation 'α' may be limited to between about 15 degrees to about 30 degrees in any direction from vertical.

The hinged center point 16 provides a first limitation to the directionality of the flailing effect created by the hydrodynamic forces of pressurized water discharging from the nozzle by maintaining the water stream in a generally upward direction. An outer limiting guard 30 may thereby further provide a sprinkler pattern limitation and allow the user to adjust and configure an overall spray pattern by providing a guide barrier. This guide 30 may be aligned and positioned by a user to create a specific shape, with the specific shape directly corresponding to the area of a lawn that is to be irrigated by the water stream produced by the lawn sprinkler 10. The specific shape can be any shape that the user defines with the barriers 30. In one embodiment according to the present invention, the barriers 30 may be metal hooks, springs, rubber bands or the like. Further, the barrier 30 may be made of one continuous piece of material constructed in a predetermined shape, or a plurality of barriers 30 can be connected together to form any shape that a user desires for the purpose of irrigating that specific shape.

A base or bottom portion 40 may be provided including a counterweight for counterbalancing the weight of the nozzle, or otherwise for affixing to the ground using pins, stakes or other conventionally available mechanisms.

2. Operation of the Preferred Embodiment

In operation, the present invention harnesses the otherwise undesired effect that results from a high velocity liquid being discharged from a flexible conduit. Such a condition would otherwise cause an undirected and non-useful flailing and random spraying of the liquid discharge in an uncontrolled manner. In contrast, the present invention provides a useful and adjustable spray pattern for a sprinkler in a mechanically and commercially simple, reliable and consistent manner. When water is flowed through the hose and discharged out of the nozzle in one direction, water is forced out of the hose and a reaction force moves the hose moves back in an opposite direction. As explain why by using Newton's third law, momentum is conserved with the water being forced out of the hose and the hose itself moving backwards. Before the water flow begins, neither the water nor the hose are in motion such that the system has no momentum. Once the water is turned on, the water has momentum in the forward direction, so for the total momentum of the hose and the water to stay the same, the hose must have an equal amount of momentum in the opposite direction. The hose moves backward. If the hose and the water are not acted on by any other forces, momentum is conserved. When the movement of the hose is thereby interfered with or limited, the movement of the hose, and the corresponding water flow, is changed in a different direction until the guard is encountered again. The lawn sprinkler 10 may be weighted or secured to the ground by a stake in a desirable location. The user then defines a specific shape to be irrigated by aligning and positioning the barrier 30 in the specific shape. Once the specific shape is defined by the user, the user connects a fluid source 26, such as an outside faucet, to the water inlet member 28 to propel the water through the nozzle assembly 12. The water travels through the nozzle assembly 12, and is dispensed from the nozzle 20 as a jet stream of water 22. The inclusion of detents within an inner surface of the barrier guard may additionally aid in creating a random change of direction onto the flexible hose when the flailing nozzle strikes the inner surface during operation.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A lawn sprinkler comprising:
   a fluid nozzle arranged in such a way that they mimic the geometry and function of a flailing hose, having no stable point of rest and therefore moving erratically and randomly in response to flowing pressurized water passing there through discharging water, wherein said fluid nozzle further comprises:
      a lower ridged conduit rotationally connected to a water intake at a lower terminus;
      an upper rigid conduit extending above the sprinkler pattern guiding structure; and
      a flexible connection joint connecting a lower terminus of the upper rigid conduit to an upper terminus of the lower rigid conduit wherein said flexible connection joint is a directionally pliable flexible tube; and
   a user-definable area, said user-defined area formed by a sprinkler pattern guiding structure forming an annulus having an adjustable shape and circumference and through which the fluid nozzle passes and creating a limitation restraint that limits movement of the flailing fluid nozzle to an area defined by the sprinkler pattern guiding structure to create an overall water spray pattern concomitant with the user-defined area.

2. The water sprinkler of claim 1, wherein said fluid nozzle further comprises:
   a lower tubing element;
   a flexible hinge affixing a lower terminus of the lower tubing element at a nadir connection and in fluid communication with a supply hose at a supply hose connection;
   an axial motion restriction element positioned between the lower tubing element and an upper tubing element for providing an axial limiting of the dynamic flailing motion.

3. The water sprinkler of claim 2, wherein said axial limiting is between at least 15 degrees to up to 30 degrees in any direction from vertical.

4. The water sprinkler of claim 2, wherein said flexible tube further comprises two lengths of rigid tubing, an upper and lower, connected together at the center by a hinge of flexible rubber hose to provide a-movable connection between the two lengths of rigid tubing.

5. The water sprinkler of claim 3, further comprising a discharge nozzle terminating an apex of the nozzle assembly.

6. The water sprinkler of claim 4, further comprising a discharge nozzle terminating an apex of the nozzle assembly.

7. The water sprinkler of claim 2, wherein a shape of the annulus is adjustable and defines the user defined area.

8. The water sprinkler of claim 3, wherein a shape of the annulus is adjustable and defines the user defined area.

9. The water sprinkler of claim 4, further comprising a limiting ring circumscribing a perimeter about the lower length of rigid tubing defining the user defined area.

10. The water sprinkler of claim 5, further comprising a limiting ring circumscribing a perimeter about the lower length of rigid tubing defining the user defined area.

11. The water sprinkler of claim 6, further comprising a limiting ring circumscribing a perimeter defining the user defined area.

12. The water sprinkler of claim 1, further comprising a limiting ring circumscribing a perimeter defining the user defined area.

13. The water sprinkler of claim 1, wherein said user defined area is selected from a group consisting of: a geometric area; and a specific shape directly corresponding to the area of a lawn.

14. The water sprinkler of claim 1, wherein said user defined area is selected from a group consisting of: a geometric area; and a specific shape directly corresponding to the area of a lawn.

15. The water sprinkler of claim 2, wherein said user defined area is selected from a group consisting of: a geometric area; and a specific shape directly corresponding to the area of a lawn.

16. The water sprinkler of claim 3, wherein said user defined area is selected from a group consisting of: a geometric area; and a specific shape directly corresponding to the area of a lawn.

17. The water sprinkler of claim 4, wherein said user defined area is selected from a group consisting of: a geometric area; and a specific shape directly corresponding to the area of a lawn.

18. The water sprinkler of claim 5, wherein said user defined area is selected from a group consisting of: a geometric area; and a specific shape directly corresponding to the area of a lawn.

19. The water sprinkler of claim 7, wherein said user defined area is selected from a group consisting of: a geometric area; and a specific shape directly corresponding to the area of a lawn.

* * * * *